Dec. 24, 1963 R. A. RIGHTMIRE 3,115,427
ELECTROCHEMICAL REACTION APPARATUS
Filed May 2, 1960 2 Sheets-Sheet 1

INVENTOR.
ROBERT A. RIGHTMIRE
BY
Kramer + Sturges
ATTORNEYS.

Dec. 24, 1963  R. A. RIGHTMIRE  3,115,427
ELECTROCHEMICAL REACTION APPARATUS
Filed May 2, 1960  2 Sheets-Sheet 2
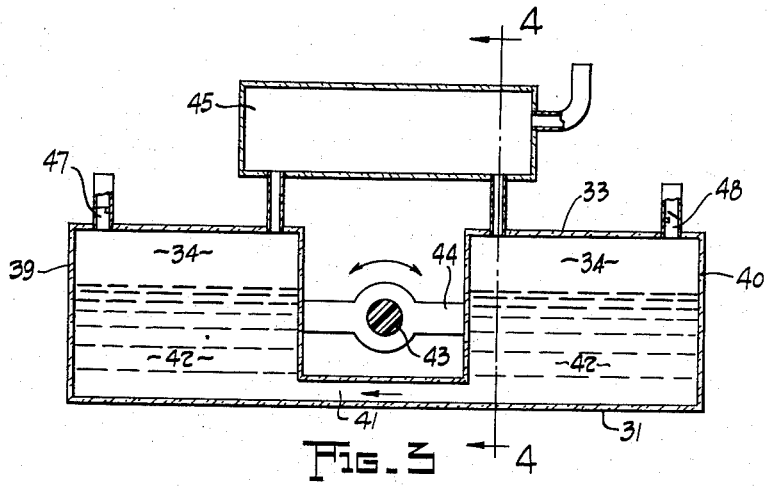
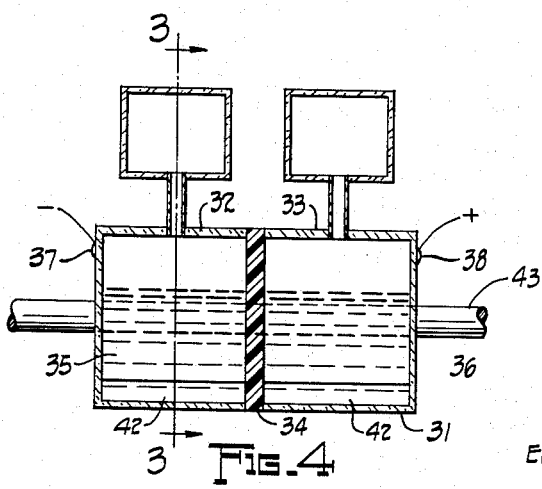
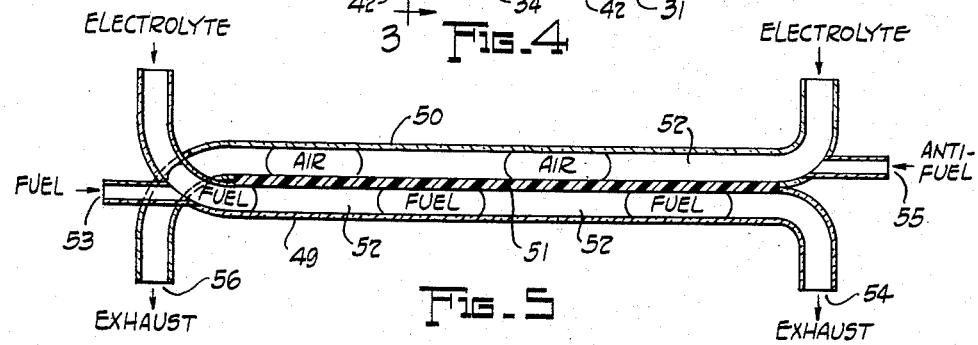
INVENTOR.
ROBERT A. RIGHTMIRE
BY
Kramer + Sturger
ATTORNEYS.

United States Patent Office 3,115,427
Patented Dec. 24, 1963

3,115,427
ELECTROCHEMICAL REACTION APPARATUS
Robert A. Rightmire, Twinsburg, Ohio, assignor to The Standard Oil Company, Cleveland, Ohio, a corporation of Ohio
Filed May 2, 1960, Ser. No. 26,238
3 Claims. (Cl. 136—86)

This invention relates generally to the direct conversion of one form of energy to another and more particularly relates to an apparatus and method for accomplishing such direct conversion electrochemically. The principles of the invention, for exemplary purposes, will be described in reference to a fuel cell for directly converting chemical energy into electrical energy, it being understood, however, that these principles are applicable to other types of electrochemical reaction apparatus as well.

The direct conversion of chemical energy into electrical energy is accomplished by causing chemical reactions to take place between electrochemically reactive materials at the junctures between spaced electron conductors and an intermediately disposed ion-containing and conducting medium to form a continuous energy exchange system. The reactive materials are separately supplied to each juncture so that the charge exchange of the reaction takes place ionically through the ion-conductor forming an internal circuit, and electronically through the electron conductor forming an external circuit. Thus, where the reactive materials are continuously supplied and an electrical load is coupled to the external circuit, it is possible to electrochemically convert the energy of chemical reaction directly into electrical energy in the external circuit.

By way of example, where hydrogen is employed as one of the materials, and oxygen as the other, the oxidation and reduction, respectively, of each of these materials at the corresponding juncture between the electronic and ionic conductors generates electrical energy in the external circuit and produces water as a by-product of the reaction. When each of the materials is continuously supplied and consumed within such an apparatus, it may be likened respectively to a fuel and to an anti-fuel, the former of which is selected to yield electrons in its chemical reaction and the latter of which is selected to accept electrons.

Normally, in any such apparatus, the fuel and anti-fuel are supplied in a relatively stable condition and some means is required for activating their conversion from the normally stable reactant state to their reaction product state. It is believed that such conversion of the fuel and anti-fuel takes place by means of chemical adsorption to a chemisorbed state and desorption to their reaction product state at the corresponding junctures between the electron and ion conductors. Such conversion of the fuel and anti-fuel is not practically self-motivating and is, therefore, preferably enhanced by the introduction of some means which will promote adsorption at each juncture and some ionic means in the ion-conducting medium which will promote desorption at each juncture. The reaction products may be removed from the apparatus in any convenient manner and preferably as they are formed.

For the purpose of description of an illustrative electrochemical reaction apparatus for accomplishing the direct conversion of chemical energy to electrical energy a fuel cell will be used. The electron-conductors will be identified as electrodes and more specifically as the anode and cathode respectively, depending upon whether they are on the fuel or anti-fuel side of the cell. The fuel will be identified throughout as any substance which is oxidizable relative to the anti-fuel which will in turn be identified as any substance which is reducible relative to the fuel; where oxidation and reduction, respectively, contemplate the release and acceptance of electrons. The ion conductor will be identified throughout as any medium which is capable of conducting an electrical charge associated with an atom or a group of atoms, i.e., ions, and which, therefore, electronically isolates the electronic conductors from each other in the internal circuit. The junctures between the electrodes and the ion conductor will be identified throughout as interfaces. The activating means for promoting the conversion of the fuel and anti-fuel from their reactant state through the chemisorbed state to the reaction product state will be more specifically identified in conjunction with their functional coaction in the cell and as an adsorber and a desorber. This overall reaction will be referred to as an electrochemical reaction.

Briefly stated, the present invention is more particularly concerned with the component parts of such electrochemical energy conversion apparatus, and contemplates the concept of relative movement between the electrode and the ion-containing and conducting medium to provide greater effective electrode working area without an increase in cell volume or weight. The utilization of this innovation provides, in addition prevention of concentration polarization. Although the basic princple of the present invention is best embodied in terms of rotating disc-shaped electrodes, in a general sense, the invention includes any current producing or current accepting electrochemical reaction cell in which the electrode exhibits a motion relative to any ion-containing and conductng medium whether by rotating, reciprocating, or otherwise.

In case of a fuel cell type electrochemical reaction cell, the primary advantage afforded by the use of moving electrodes with respect to the ion-containing and conducting medium, is the increase in current density available by the expedient of moving the electrode alternately through the gas phase of the fuel or the anti-fuel, and through the liquid phase of the ion-containing and conducting medium. In this manner, the effective working surface of the electrode in any one interval of time is increased without enlarging the physical dimensions of the electrode. The continuous presentation of fresh electrode surface to the gas phase, formation of the adsorption complex, and subsequent intimate contact with the liquid electrolyte allows the electrochemical reaction to proceed at a rate which is no longer limited by rates of diffusion toward and away from the electrode.

The utilization in an electrochemical reaction apparatus of the principle of relative movement of the electrode with respect to the ion-containing and conducting medium eliminates the problems of electrode flooding encountered in conventional fuel cells having static porous electrodes. In the case of the ordinary fuel cell a precarious balance must be maintained between the pressure of the gaseous reactant fuel or anti-fuel and that of the liquid ion-containing and conducting medium in order to maintain a region of contact within the porous electrode. If this balance is disrupted such that the liquid electrolyte completely fills or floods the pores of the electrode, the rate of the electrochemical reaction falls off and the power output of the cell is greatly diminished. However, in the case of the cells embodying the principles of the present invention, the electrode surface is presented alternately to the gaseous reactant, or fuel, or to the gaseous anti-fuel as the case may be, and then to the ion-containing and conducting medium so that flooding cannot occur.

Electrodes which may be used in accordance with this invention do not necessarily possess a high degree of porosity for obtaining maximum current densities. Thus, strong and more compact electrodes may be utilized to obtain current densities equivalent to those obtained with the dimensionally larger stationary or static porous electrodes. Higher current densities may be obtained with moving electrodes than are obtained from the dimensionally equivalent static porous electrodes.

Another advantage of cells embodying the principle of the present invention is that they may be designed for high pressure operation and thus secure the benefits of rate increases afforded by the great space concentrations of the gaseous fuel and anti-fuel. This is made possible by the fact that the rotating electrodes may tolerate a lower degree of porosity and a precise pressure balance is not required to maintain a gas-liquid interface within the body of the electrode.

A further benefit is derived from the mechanical effect of the relative motion of the electrode with respect to the ion-containing and conducting medium. In static electrode cells using liquid electrolytes, there is a tendency for concentration polarization to occur, thus radically reducing the efficiency and resulting power output of the cell. However, with the devices of the present invention, the mechanical agitation of the liquid ion-containing and conducting medium caused by the motion of the electrode relative thereto prevents such concentration polarization from occurring.

Prior devices have required the circulation of the fuel and anti-fuel reactant material through the cell, necessitating the employment of auxiliary equipment to regulate and provide flow, not to mention the cost and complexity of the total installation. With the employment of electrodes which are movable relative to the ion-containing and conducting medium such as the rotating electrodes, it is necessary only to maintain an atmosphere of the gaseous reactants in the electrode compartments thereby avoiding circulation of the reactants and the employment of auxiliary equipment.

In the annexed drawings,

FIG. 3 is a diagrammatic view of a modified form of fuel cell in accordance with the present invention.

FIG. 4 is a cross-sectional view of the fuel cell shown in FIG. 3 taken on the line 4—4.

FIG. 5 is a diagrammatic cross-sectional view of another form of fuel cell in accordance with the present invention.

Figure 1:
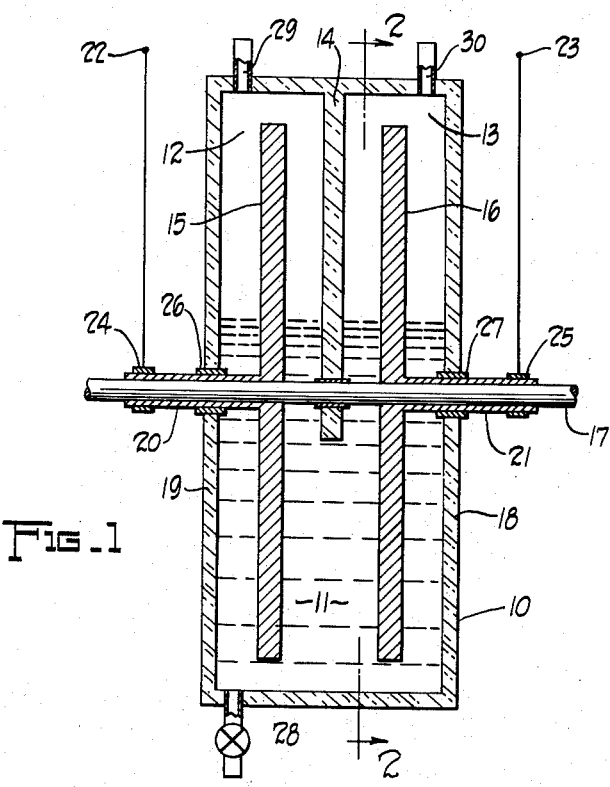
FIG. 1 is a cross-sectional view of a fuel cell having rotating, disc-type electrodes.

Referring now more particularly to FIG. 1, there is provided a fuel cell body 10 formed of any suitable non-conducting material, such as glass, hard rubber, plastic, or the like, adapted to contain a liquid electrolyte 11 which contains ions of an acid, base or salt in solution in an aqueous medium. Compartments 12 and 13, adapted to receive and contain a fuel and an anti-fuel, respectively, are defined by the walls of the cell body 10, the surface of the ion-containing and conducting medium 11, and depending wall segment 14 which is adapted to intersect the surface of the liquid and provide liquid seal for each of said compartments 12 and 13. Disposed on each side of the cell are electrodes 15 and 16, both of which electrodes are in contact with the ion-containing and conducting medium 11, and respectively, in contact with chambers 12 and 13. Electrodes 15 and 16 are mounted for rotation with axle 17 rotatory motion being imparted thereto by any suitable means, not shown. Axle 17 pierces the outer walls 18 and 19 of the cell body 10, and is journaled for rotation in wall segment 14. Electrodes 15 and 16, which are conveniently formed of some metallic substance such as steel having the surfaces thereof coated with very finely divided platinum, palladium, or other noble metal are provided, respectively, with sleeves 20 and 21 surrounding the axle 17 and providing electrical communication between the electrodes 15 and 16 and terminals 22 and 23. Any suitable pickup means, such as slip rings 24 and 25 may be employed to transmit the electrical current to the respective terminals 22 and 23. To prevent leakage of the electrolyte 11 from the cell body 10, suitable packing glands 26 and 27 may be provided. Since, in the normal operation of the cell, particularly with hydrogen and oxygen as the fuel and anti-fuel respectively, water is a product of the electrochemical reaction, suitable drain means 28 are provided in the bottom of the cell for periodic removal of the aqueous medium to maintain proper liquid level within the cell body. Inlet means 29 and 30 are conveniently provided for the fuel and anti-fuel respectively.

FIGS. 3 and 4 illustrate diagrammatically another form of device in which relative movement between the electrode and the ion-containing and conducting medium may be secured. In accordance with the illustrated modification, there is provided a fuel cell body 31, which is divided into two symmetrical parts 32 and 33 by an ion-permeable membrane 34. A view transversely through section 33 is shown in FIG. 3. Section 32 is adapted to receive a fuel, and section 33 is adapted to receive an anti-fuel. Since the membrane 34 serves to insulate sections 32 and 33 from each other electrically, the walls of the sections 32 and 33, respectively, may function as the electrode for the fuel, and for the anti-fuel, respectively. A platinum black coating 35 on the wall of the fuel chamber 32, and a corresponding platinum black coating 36 on the wall of the anti-fuel chamber in electrical communication with terminals 37 and 38, respectively, provide the electronic portion of the circuit when terminals 38 and 39 are connected to an external load.

Referring more particularly to FIG. 3, the section 33 is divided into two chambers 39 and 40 in fluid communication with each other through passageway 41. As indicated in FIG. 4, the platinum black surface 36 covers the entire opposite wall of the cell body 31 and is partially immersed in the ion-containing and conducting medium 42 disposed in chambers 39, 40 and in section 35. The same or different electrolytes may be used in the sections 35 and 36. The section 33 is mounted for reciprocal rotation about the axle 43 by means of support on 44. Section 33 is the anti-fuel side of the cell body 31, and in the most convenient form utilizes air as the anti-fuel. Thus ballast tank 45 is provided communicating with both compartments 39 and 40 to allow for gaseous transfer of the gas contained in chamber 39 or 40 through the ballast tank 45 as the cell body 31 is rocked back and forth on axle 43. The ion-containing and conducting medium 42 flows back and forth through the channel 41 in response to the movement of the cell body. Air, as the anti-fuel containing free oxygen, is introduced through the conduit 46. The opposite section 32 is of identical structure as the section 33 and adapted to be connected with the ion-permeable membrane 34 by any suitable means not shown, as indicated, however, in FIG. 4. Exhaust means 47 and 48 are provided in each of the chambers 39 and 40 respectively, for removal of unused nitrogen and water vapor produced in the course of the electrochemical reaction.

As the cell body 31 oscillates on the axle 43, the electrolyte 42 flows through the conduit 41 tending to fill the lowermost disposed of chambers 39 and 40, resulting in a substantial increase in the surface area of electrode 36 exposed to the anti-fuel. While the opposite chamber becomes filled with the electrolyte 42, electrochemical reaction between the anti-fuel adsorbed on the surface of the electrode 36 undergoes electrochemical reaction in the presence of the electrolyte 42, becoming desorbed in the form of ions, and taking up on the anti-fuel side, electrons from the external circuit. The alternate bathing and exposing of the electrode surface 36, in combination with the agitation of the electrolyte 42 minimizes concentration polarization, and thereby increases the efficiency of the cell.

FIG. 5 shows another embodiment employing the principle of relative movement between the electrolyte and the electrode. FIG. 5 is a diagrammatic illustration of such an embodiment utilizing a pair of tubular electrodes 49 and 50 disposed side by side, and having the common wall between them in the form of a membrane 51 which is permeable to ions contained in the electrolyte 52 as derived from either the fuel or the anti-fuel. Any suitable means, not shown, for pumping the electrolyte through the tubular electrode members may be employed. Electrode 49 is provided with a fuel inlet 53 which is in turn connected with a pulsing feeding system, forming no part of the present invention and therefore not shown, by which slugs of fuel are forced into the electrolyte stream. Tubular electrode 49 is also provided with an exhaust means at its opposite end 54. In like manner, the anti-fuel is fed in through inlet 55 and tubular electrode 50, and exhausts through outlet 56. The anti-fuel is similarly fed to the tubular electrode 50 by any conventional pulsing mechanism, not shown, to provide slugs of anti-fuel in the electrolyte stream. By moving the electrolyte-anti-fuel system across the electrode surface of the tubular member, the electrode is alternately bathed with electrolyte and with anti-fuel. In like manner, the fuel electrode is alternately bathed with fuel and electrolyte, and the electrochemical reaction takes place, the internal circuit being completed by the migration of the ions through the ion-permeable member 51.

The basic concept of the present invention resides in the improvements obtained by substituting a relative movement relationship between the electrode and the ion-containing and conducting medium for a stationary relationship therebetween. No limitation as to fuels, anti-fuels, electrode compositions, electrolytes, or other components is considered to apply. The rapid sequential exposure of successive areas of the electrode surface to gaseous reactant, liquid electrolyte, gaseous reactant again, etc., has the consequence of increasing the effective working surface area of the electrode without increasing its dimension and the overall production of higher current densities and greater available power output from the cell. This improvement applies equally to any combination of electrodes, electrolytes and other components found to be operable in a fuel cell and the best representation of the concept of the invention is generalized in FIGS. 1 and 2.

Figure 2:
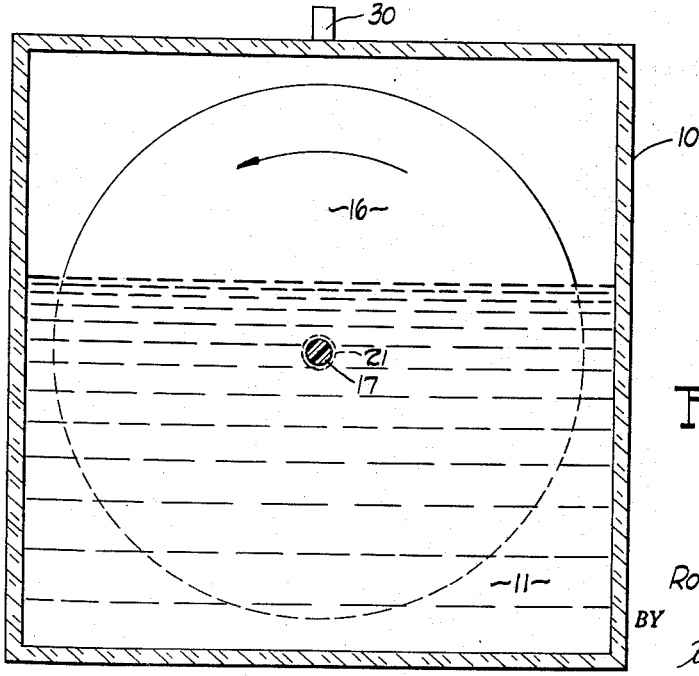
FIG. 2 is a transverse cross-sectional view taken on the line 2—2 of FIG. 1.

In operation, a segment of the electrode 15 or 16 is exposed to the atmosphere of the gaseous reactant, fuel or anti-fuel as the case may be, the gaseous reactant is adsorbed on the electrode surface, the rotational motion of the electrode carries the adsorbed gaseous reactant into the liquid electrolyte 11, the electrochemical reaction occurs with the consequent transfer of electrons to or away from the electrode, the segment of the electrode emerges from the liquid electrolyte into the atmosphere of gaseous reaction, and the sequential process is repeated over and over as long as the electrode continues to rotate. There are many possible mechanical arrangements whereby electrodes in the fuel compartment and in the anti-fuel compartment may be rotated by means of a single shaft one of which is shown in FIGS. 1 and 2. The segments of the shaft are electrically insulated from each other so that short circuiting between the electrodes 15 and 16 cannot occur, and the shaft segments are electrically conducting otherwise as by means of sleeves 20 and 21 so that the power output of the cell may be tapped off the externally protruding ends of the sleeve. Although not shown in the drawings, means are provided for replenishing the supplies of fuel and anti-fuel in the respective compartments as they become exhausted. The fuel and anti-fuel, respectively, may be maintained under pressure, if desired. There has thus been provided, a fuel cell having the characteristic of providing by means of relative motion between the electrode with respect to the electrolyte in the repetitive sequential exposure of electrode surfaces to reactant fuel or reactant anti-fuel, and the electrolyte greater power outputs than fuel cells with stationary electrodes but otherwise equivalent.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. In a fuel cell for the electrochemical reaction of a fuel with an antifuel to produce electrical energy, and having a cell body, an external circuit including a pair of spaced non-reactive electrodes disposed in said cell body and adapted for operative coaction with the fuel and antifuel, respectively, an internal circuit therefor including ion-containing and conducting means disposed in said cell body in the space between the electrodes and adapted to form an interface with the immersed surface of each of said electrodes, means for providing a supply of fuel for the interface at one electrode, separate means for providing a supply of antifuel for the interface at the other electrode, and means for exposing the immersed surface of each of said electrodes, respectively, to the said supplies of fuel and antifuel and alternately immersing the exposed electrode surfaces in the ion-containing and conducting medium.

2. The fuel cell of claim 1 wherein said pair of spaced electrodes are each elongated tubular members disposed with their tubular axes parallel to each other and having a common wall of non-conducting ion-permeable material coacting therebetween to define physically isolated tubular chambers.

3. A fuel cell for the electrochemical reaction of a fuel with an antifuel to produce electrical energy comprising a cell body, an external circuit including a pair of solid disk-shaped electrodes disposed within said cell body, means for feeding a fuel to one of said electrodes and means for feeding an antifuel to the other of said electrodes, an ion-containing and conducting medium within said cell body partially covering the surface of each of said disk-shaped electrodes to form an interface having the configuration of a segment of a circle with each of said electrodes, and means for rotating each of said electrodes to alternatively expose a portion of said electrodes to said fuel and said antifuel, respectively, and to immerse said exposed portions of said electrodes in said ion-containing and conducting medium.

References Cited in the file of this patent

UNITED STATES PATENTS

| | | |
|---|---|---|
| 268,174 | Blanchard | Nov. 28, 1882 |
| 411,426 | Dahl | Sept. 24, 1889 |
| 473,386 | Emley | Apr. 19, 1892 |
| 2,384,463 | Gunn et al. | Sept. 11, 1945 |
| 2,901,523 | Justi et al. | Aug. 25, 1959 |
| 2,913,511 | Grubb | Nov. 17, 1959 |

FOREIGN PATENTS

| | | |
|---|---|---|
| 152,364 | Great Britain | Feb. 14, 1922 |